United States Patent
Jalali (10) Patent No.: US 10,341,010 B2
(45) Date of Patent: Jul. 2, 2019

(54) MOBILITY AND POWER MANAGEMENT FOR HIGH ALTITUDE PLATFORM (HAP) COMMUNICATION SYSTEMS

(71) Applicant: Bridgewest Finance LLC, San Diego, CA (US)

(72) Inventor: Ahmad Jalali, Rancho Santa Fe, CA (US)

(73) Assignee: Bridgewest Finance LLC, San Diego, CA (US)

(*) Notice: Subject to any disclaimer, the term of this patent is extended or adjusted under 35 U.S.C. 154(b) by 0 days.

(21) Appl. No.: 14/624,320

(22) Filed: Feb. 17, 2015

(65) Prior Publication Data

US 2015/0236781 A1    Aug. 20, 2015

Related U.S. Application Data

(60) Provisional application No. 61/946,575, filed on Feb. 28, 2014, provisional application No. 61/940,805, filed on Feb. 17, 2014.

(51) Int. Cl.
*H04B 7/185*     (2006.01)
*H04W 36/30*     (2009.01)
(Continued)

(52) U.S. Cl.
CPC ....... *H04B 7/18504* (2013.01); *B64C 39/024* (2013.01); *H04B 7/1555* (2013.01);
(Continued)

(58) Field of Classification Search
None
See application file for complete search history.

(56) References Cited

U.S. PATENT DOCUMENTS

| | | |
|---|---|---|
| 4,879,711 A | 11/1989 | Rosen |
| 5,642,122 A | 6/1997 | Lockie et al. |

(Continued)

OTHER PUBLICATIONS

Mohorcic et al. Broadband Communications from Aerial Platform Networks. Research Paper.—Y 2004 [retrieved on Apr. 20, 2015]. Retrieved from the internet: <URL: 2-10 http://www.researchgate. net/profile/Mihael_Mohorcic/publication/215650814 Broadband_Communicationsfrom_Aerial_Platform_Networks/links/ 09e41510815e28b01b000000.pdf> entire document.

*Primary Examiner* — Kenny S Lin
(74) *Attorney, Agent, or Firm* — Klein, O'Neill & Singh, LLP (57) ABSTRACT

A communication system is described. The system includes: at least one gateway able to provide broadband connectivity, a set of ground terminals, and a set of high altitude platforms (HAPs), where at least one aerial platform is able to communicate with at least one gateway using radio frequencies, each HAP is able to communicate with ground terminals using radio frequencies, and each HAP is able to communicate with each other HAP using radio frequencies. Ways to handoff a ground terminal/gateway from one HAP beam to another HAP beam are described. Ways to handoff a ground terminal/gateway from one HAP to another HAP are described. Ways that keep the communications payload radios active when there is data traffic and put the radios in sleep mode otherwise, thereby adjusting the communications payload power consumption to the data traffic requirements as a function of time and coverage area, are described.

18 Claims, 8 Drawing Sheets

(51) Int. Cl.
*H04W 24/02* (2009.01)
*H04W 36/36* (2009.01)
*H04W 36/00* (2009.01)
*B64C 39/02* (2006.01)
*H04W 84/06* (2009.01)
*H04B 7/155* (2006.01)
*H04W 36/12* (2009.01)
*H04W 48/16* (2009.01)
*H04W 88/16* (2009.01)
*H04W 84/00* (2009.01)

(52) U.S. Cl.
CPC ..... *H04B 7/18506* (2013.01); *H04B 7/18528* (2013.01); *H04B 7/18539* (2013.01); *H04B 7/18541* (2013.01); *H04B 7/18543* (2013.01); *H04B 7/18554* (2013.01); *H04B 7/18578* (2013.01); *H04W 24/02* (2013.01); *H04W 36/0005* (2013.01); *H04W 36/0083* (2013.01); *H04W 36/30* (2013.01); *H04W 36/36* (2013.01); *H04W 84/06* (2013.01); *B64C 2201/122* (2013.01); *H04W 36/0016* (2013.01); *H04W 36/12* (2013.01); *H04W 48/16* (2013.01); *H04W 84/005* (2013.01); *H04W 88/16* (2013.01); *Y02D 70/00* (2018.01); *Y02D 70/1242* (2018.01); *Y02D 70/1262* (2018.01); *Y02D 70/142* (2018.01); *Y02D 70/164* (2018.01); *Y02D 70/446* (2018.01)

(56) References Cited

U.S. PATENT DOCUMENTS

| | | | |
|---|---|---|---|
| 5,859,620 A | 1/1999 | Skinner et al. | |
| 5,974,317 A | 10/1999 | Djuknic et al. | |
| 6,167,036 A | 12/2000 | Beven | |
| 6,393,281 B1 * | 5/2002 | Capone | H04W 52/52 455/3.05 |
| 6,856,803 B1 | 2/2005 | Gross et al. | |
| 7,123,919 B1 | 10/2006 | Driessen | |
| 9,100,086 B1 * | 8/2015 | Olsen | H04B 7/18504 |
| 9,528,687 B1 * | 12/2016 | Kress | F21V 13/04 |
| 2002/0072360 A1 * | 6/2002 | Chang | H01Q 1/007 455/427 |
| 2002/0072361 A1 * | 6/2002 | Knoblach | H04B 7/18576 455/431 |
| 2002/0082012 A1 * | 6/2002 | Wang | H04W 36/32 455/436 |
| 2002/0122412 A1 | 9/2002 | Chen et al. | |
| 2002/0126042 A1 | 9/2002 | Chang et al. | |
| 2004/0142658 A1 * | 7/2004 | McKenna | H01Q 1/007 455/11.1 |
| 2004/0147222 A1 | 7/2004 | Walsh et al. | |
| 2005/0042984 A1 * | 2/2005 | Kolar | H04B 7/18532 455/13.2 |
| 2005/0197748 A1 * | 9/2005 | Holst | G06F 8/61 701/3 |
| 2006/0223573 A1 * | 10/2006 | Jalali | H04W 36/0055 455/552.1 |
| 2006/0229104 A1 * | 10/2006 | de La Chapelle | H04B 7/18506 455/562.1 |
| 2007/0021119 A1 * | 1/2007 | Lee | H04W 36/0066 455/436 |
| 2007/0177549 A1 | 8/2007 | Lo et al. | |
| 2008/0274734 A1 * | 11/2008 | Kostanic | H04B 7/18508 455/431 |
| 2010/0260146 A1 * | 10/2010 | Lu | H04L 12/4633 370/331 |
| 2011/0267985 A1 * | 11/2011 | Wilkinson | H04M 1/2535 370/259 |
| 2013/0231106 A1 | 9/2013 | Knoblach et al. | |
| 2013/0321214 A1 | 12/2013 | Zhou et al. | |

* cited by examiner

MOBILITY AND POWER MANAGEMENT FOR HIGH ALTITUDE PLATFORM (HAP) COMMUNICATION SYSTEMS

CROSS-REFERENCE TO RELATED APPLICATIONS

This application claims priority to U.S. Provisional Patent Application Ser. No. 61/940,805, filed on Feb. 17, 2014, and U.S. Provisional Patent Application Ser. No. 61/946,575, filed on Feb. 28, 2014.

BACKGROUND OF THE INVENTION

As internet traffic has increased over the years, new technologies are needed to deliver broadband access to homes and enterprises at lower cost and to places that are not yet covered. Current broadband access systems have a number of shortcomings. One issue is a lack of service in remote, lightly populated, and underdeveloped areas. Geostationary satellites do provide service in remote areas of the developed world, such as within the United States. Poorer areas of the world, such as Africa, however, lack adequate satellite capacity.

A notable reason satellite capacity has not been adequately provided in poor regions of the world is the relatively high cost of satellite systems. Due to adverse atmospheric effects in satellite orbits, satellite hardware must be space qualified and is costly. Launch vehicles to put the satellites in orbit are also costly. Moreover, due to the launch risk and high cost of satellites, there is a significant cost to insure the satellite and the launch. Therefore, broadband satellite systems and services are relatively costly and difficult to justify in poor regions of the world. It is also costly to deploy terrestrial systems such as fiber or microwave links in lightly populated regions. The small density of subscribers does not justify the deployment cost.

Thus, there is a need for an efficient way to provide broadband service to poor, lightly populated, and underdeveloped regions using aerial platforms.

BRIEF SUMMARY OF THE INVENTION

Many high altitude platforms (HAPs) such as airplanes, balloons, and drones or unmanned aerial vehicles (UAVs) have been or will be deployed in various regions around the world. Such platforms may be deployed in a more cost effective manner than typical satellite networks.

Some embodiments provide ways to handoff a ground terminal (GT) from one HAP beam to another HAP beam (intra-HAP handoff). The ground terminals measure received signal strength (RSS) on received signals from beams of the neighboring HAP beams to the HAP beam communicating with the GT and choose the neighboring beam whose RSS is within or exceeds a threshold of that of the serving beam as the candidate HAP beam. The GT, upon finding a candidate HAP beam, may send a handoff request message to the candidate HAP beam radio unit. The candidate HAP beam radio unit may send an information request message to the HAP serving beam radio unit requesting information on the GT IP session. The HAP serving beam radio unit may send the requested information to the candidate HAP beam radio unit in an information response message. The candidate HAP beam radio unit may send an address mapping message to the HAP sub-systems to change their routing tables by mapping the IP address of the ground terminal to the candidate HAP beam radio unit medium control access (MAC) address. Next, the candidate HAP beam radio unit may send a handoff completion message to the GT and the HAP sub-systems and become the new HAP serving beam. The previous HAP serving beam radio unit may send any outstanding packets to the GT and the new packets destined for the ground terminal are sent to the new HAP serving beam radio unit.

Some embodiments describe systems and methods to handoff a GT from one HAP to another HAP (inter-HAP handoff). The GTs may measure received signal strength (RSS) on received signals from HAPs neighboring the HAP communicating with the ground terminal and choose the neighboring HAP whose RSS is within a threshold of that of the serving HAP as the candidate HAP. The GT, upon finding a candidate HAP, may send a handoff request message to the candidate HAP. The candidate HAP may send an information request message to the serving HAP requesting information on the GT IP session. The serving HAP may send the requested information to the candidate HAP in an information response message. The candidate HAP may send an address mapping message to the HAP sub-systems to change their routing tables by mapping the IP address of the GT to the candidate HAP MAC address. Next, the candidate HAP may send a handoff completion message to the GT and the HAP network sub-systems and become the new serving HAP. The previous serving HAP may send any outstanding packets to the ground terminal, and the new packets destined for the ground terminal are sent to the new serving HAP.

Some embodiments provide a GT with at least two antenna aperture/beams, one antenna aperture/beam, referred to as a searching antenna, may be used to search for candidate HAPs in inter-HAP handoff, and the second antenna aperture/beam, referred to as a communications antenna, may be used to communicate with the serving HAP. During inter-HAP handoff, the searching antenna may first establish a communications link with the new serving HAP. Next, the communications antenna may steer its beam toward the new serving HAP and take over the link with the new serving HAP from the searching antenna. The searching antenna begins searching for new candidate HAPs. This scheme results in uninterrupted commutations between the HAP network and the GT. The size of the searching antenna may be smaller than that of the communications antenna to reduce the GT size and cost.

Some embodiments provide ways to minimize the power consumption of the HAP communications payload. The HAP network sub-systems may implement a sleep mode where the sub-systems go into sleep mode when they are not receiving or transmitting data. The HAP communications payload may supports an "on-off" duty cycle where during the on period the sub-systems are active and are receiving/transmitting data and during off periods the sub-systems are in sleep mode to save power. The "on-off" duty cycle mode allows the system, to adjust power consumption to the traffic.

In some embodiments, the HAP communications system may divide the time into frames, each frame consisting of multiple time slots. Certain time slots of each downlink (HAP to GT direction) frame may be referred to as scheduling time slots, which are used to carry information regarding which GTs will receive data in the upcoming frames, and during which time slots GTs will receive their data. Scheduling time slots may also carry information on the time slots reserved for each GT on uplink (GT to HAP direction) frame. The GT and HAP communications sub-systems may save power by going into sleep mode during the time slots that they do not receive or transmit data.

The preceding Summary is intended to serve as a brief introduction to various features of some exemplary embodiments of the invention. Other embodiments may be implemented in other specific forms without departing from the spirit of the invention.

BRIEF DESCRIPTION OF THE SEVERAL VIEWS OF THE DRAWINGS

The novel features of the invention are set forth in the appended claims. However, for purpose of explanation, several embodiments of the invention are set forth in the following drawings.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, as the scope of the invention is best defined by the appended claims.

Various inventive features are described below that can each be used independently of one another or in combination with other features. Broadly, some embodiments of the present invention generally provide a way to provide HAP-based communication.

HAPs may include, for instance, drones, UAVs, balloons, blimps, airships, etc. Each platform may include propulsion elements, fuel systems, navigational elements, control systems, etc. In some embodiments, a drone may include a fixed wing fuselage in combination with a propeller and/or other appropriate elements. In some embodiments, a UAV may be a robo-copter or similar device. Each UAV may carry fuel and/or use solar energy (or other alternatives). Throughout this disclosure, the terms "UAV", "HAP", "aerial platform", and/or "drone" may be used to refer to any aerial platform including those described above and other appropriate aerial platforms.

Figure 1:
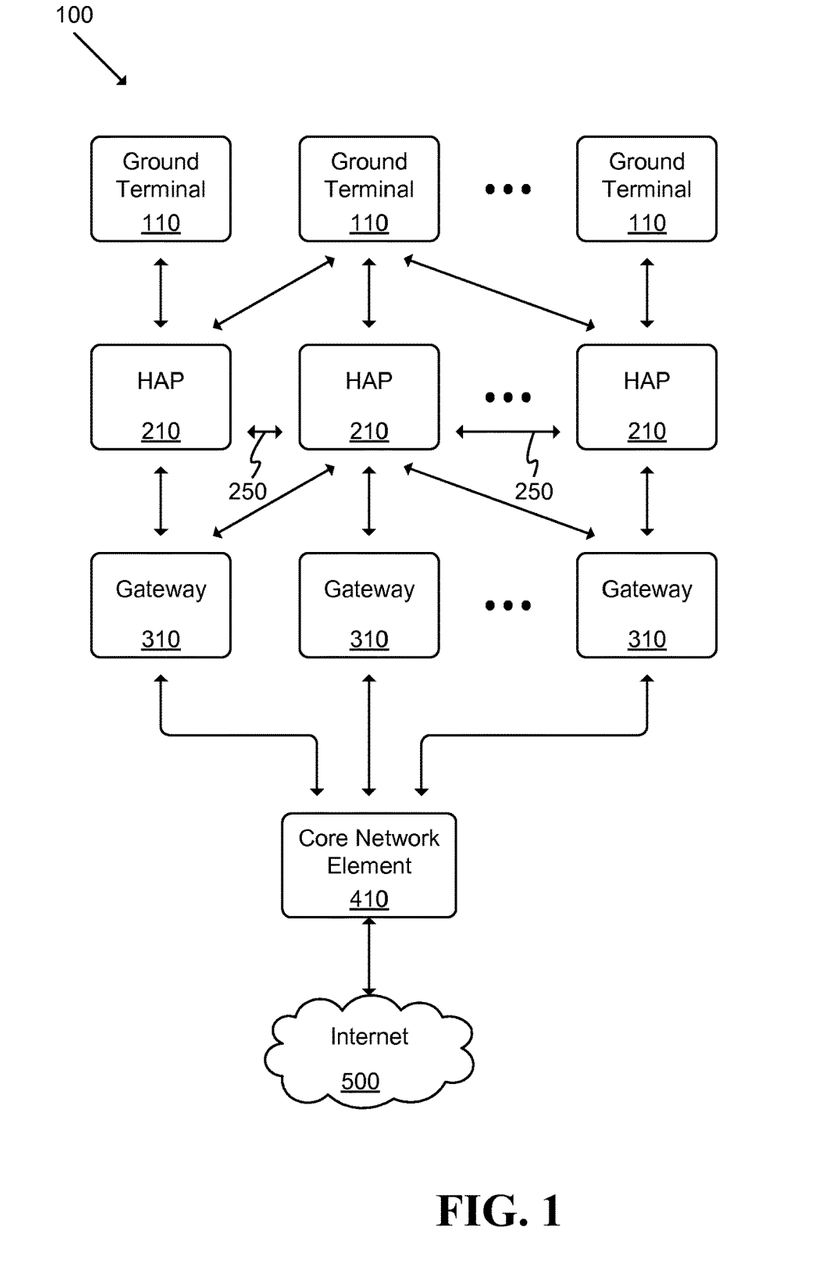
FIG. 1 illustrates a schematic block diagram of a conceptual HAP-based communications system of some embodiments.

FIG. 1 illustrates a schematic block diagram of a conceptual HAP-based communications system 100 of some embodiments. As shown, the system may include a set of ground terminals 110, a set of HAPs 210, a set of gateways (GWs) 310, a core network element (CNE) 410, and an Internet or other appropriate network connection 500.

Each HAP 210 may be able to communicate with one or more ground terminals 110 and/or one or more gateways 310 that allow connectivity to the Internet 500 via the CNE 410. The CNE may aggregate data from multiple gateways 310 to the Internet 500 and partition data received from the Internet to the gateways 310 and at least one HAP 210.

The HAPs 210 may communicate with each other via a HAP to HAP link 250. The HAP to HAP link may be used in situations where a HAP 210 is not in coverage of a gateway 310 and the HAP 210 is able to route the data via another HAP to a gateway 310.

One of ordinary skill in the art will recognize that system 100 may be implemented in various specific ways. For instance, the system may include only one HAP 210 and one gateway 310.

Figure 2:
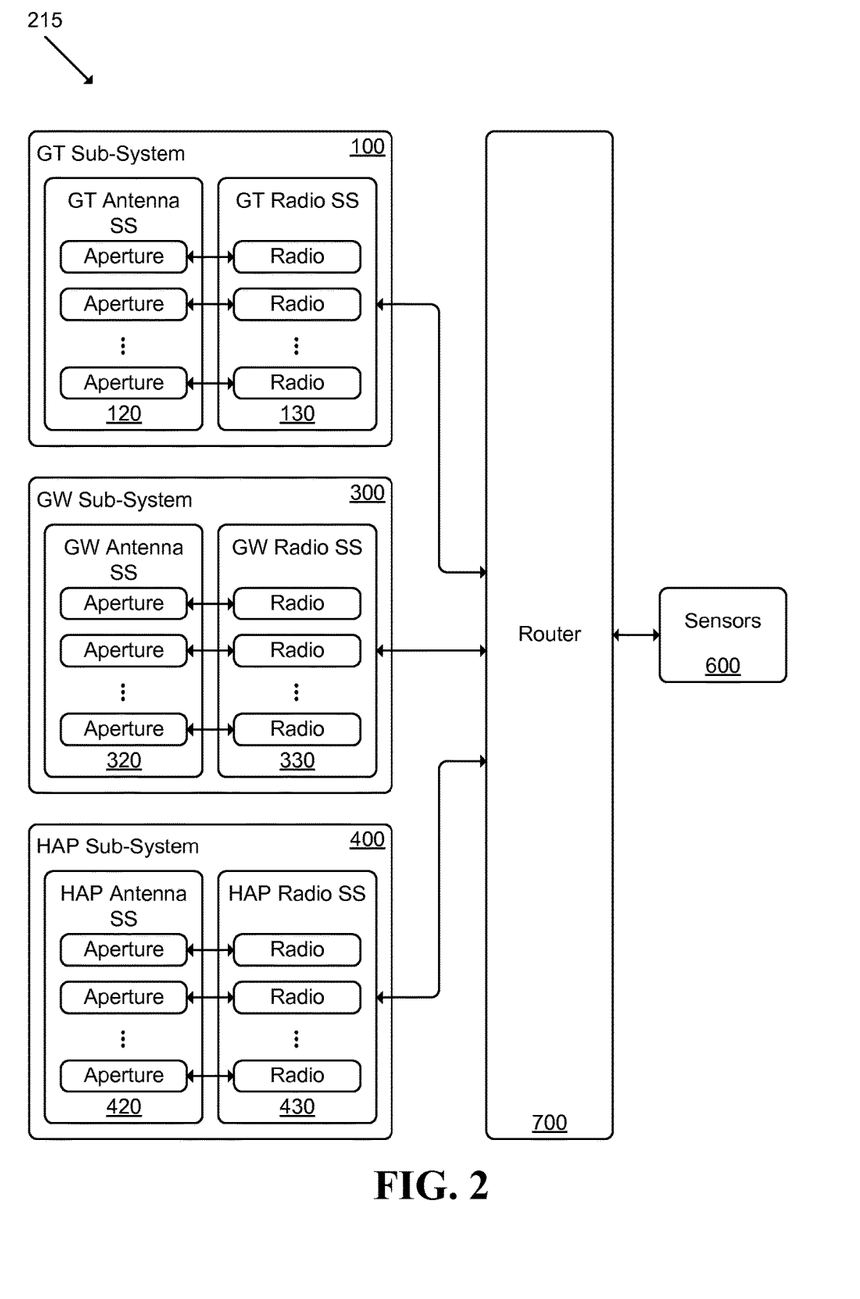
FIG. 2 illustrates a schematic block diagram of a HAP communications payload of some embodiments.

FIG. 2 illustrates a schematic block diagram of a HAP communications payload architecture 215 of some embodiments. Each HAP 210 may include multiple communications payloads 215 that allow communication among the HAP 210, the GTs 110, and the gateways 310. As shown, the communications payload 215 may include a GT sub-system 100, GW sub-system 300, HAP sub-system 400, sensors sub-system 600, and HAP platform router 700.

The sensors sub-system 600 may include sensors such as gyroscopes, accelerometers, and satellite based position location receivers such as global positioning system (GPS) receivers in order to estimate the position and orientation of a HAP 210.

The GT sub-system 100 may be able to communicate with the GTs 110. The sub-system 100 may modulate data received from router sub-system 700 that is destined for the GTs 110 and transmit the resulting modulated signals to the GTs. The GT sub-system 100 may also receive transmitted signals from GTs 110, demodulate and decode the signals and forward the resulting data packets to the router sub-system 700 for routing to the appropriate network element(s).

The GW sub-system 300 may be able to communicate with the GWs 310. The GWs may send data destined for the GTs 110 to the GW sub-system 300. The data from the GTs 110 destined for the Internet 500 may be sent to the gateways 310 via the GW sub-system 300. In cases where a HAP 210 doesn't have a connection with a GW 310, data may be routed to another HAP 210 which may, in turn, relay the data to a GW 310. The HAP sub-systems 400 may allow communications among HAPs 210.

As shown in FIG. 2, each sub-system 100, 300, 400 may have two main components, an antenna sub-system 120, 320, 420 and a radio sub-system 130, 330, 430. Each antenna sub-system 120, 320, 420 may include multiple antenna apertures, where each aperture is connected to one radio. Each radio may be able to modulate data received from the router 700 and transmit the modulated signals toward the relevant GTs 110 or GWs 310, or to other HAPs 210. Each radio may also be able to demodulate signals received from the GTs 110, GWs 310, and other HAPs 210 and forward the decoded data packets to the router 700 to be sent to the appropriate destination elements within system 100.

Each GT 110 and GW 310 may similarly include two main sub-systems: an antenna sub-system and a radio sub-system. The GT and GW radio sub-systems may be capable of modulating data destined for the HAP 210 and transmitting the resulting signals to the HAP through the antenna sub-systems connected to the radio sub-systems. The GT and GW radio sub-systems may also be capable of demodulating and decoding signals received from the HAPs and transmitting the resulting decoded data packets to the appropriate resource within system 100.

Figure 3:
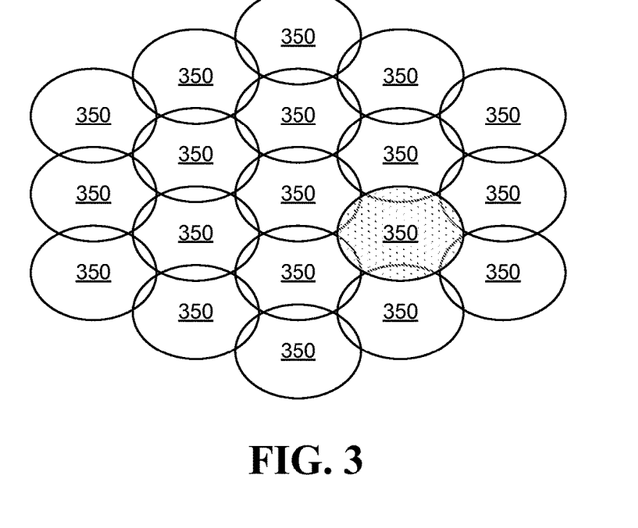
FIG. 3 illustrates an exemplary diagram of beams formed by a HAP to cover locations of ground terminals.

FIG. 3 illustrates an exemplary diagram of beams 350 formed by a HAP to cover locations of GTs. The beams may be projected by the HAP's GT antenna sub-system 120 toward a GT on the ground. Each of the HAP's GT antenna apertures may radiate a beam 350, thus collectively forming an array of beams on the ground. The number of beams may be selected to fit the throughput and coverage needs of the system. In the example of FIG. 3, the GT 110 is currently being served by a "serving GT beam" which is indicated as the shaded beam 350. The GT beams surrounding the serving GT beam may be referred to as "neighboring GT beams". Some HAPs 210, such as drones, may loiter in a small cylindrical area over a desired coverage area. As the drone cruises in the cylindrical orbital area, the beams formed by the HAP move on the ground. As the serving GT beam moves over a GT 110, the signal received by the GT radio sub-system 130 will weaken and the GT 110 may need to handover to one of the neighboring GT beams whose beam provides a stronger signal to GT 110. Such a handover or handoff of the GT from one HAP GT beam to another HAP GT beam may be referred to as an intra-HAP handoff or handover. After the handover is completed, one of the neighboring GT beams will become the new serving GT beam.

When a GT 110 is initially powered on, its radio unit may search for signals from beams of the HAP 210 providing coverage to the GT 110, and select the beam 350 from which it receives the strongest signal to be the serving GT beam. Next, the GT 110 may send a registration request message to the serving GT beam radio. The serving GT beam radio may ask the router 700 to assign an IP address to the GT 110. The serving GT beam radio may, in turn, send the assigned IP address in a registration response message to the GT. The router sub-system 700 may also update its routing table to map the IP address assigned to the GT 110 to the MAC address of the serving GT beam radio communicating with the GT. The data received from the Internet 500 and destined to the GT 110 will be routed through the communications payload 215 using the routing table in the router sub-system 700.

The first step in the intra-beam handoff process is to determine the best HAP beam for handoff or the "candidate handoff GT beam". Once a GT 110 has determined that handoff to another beam is needed, the GT may initiate the handoff process by informing the relevant sub-systems to prepare to take over the communications link from the serving GT beam. The last step in the handoff process involves changing the IP routing table of the Router sub-system so that packets will be sent to the new serving GT beam radio after handoff.

Figure 4:
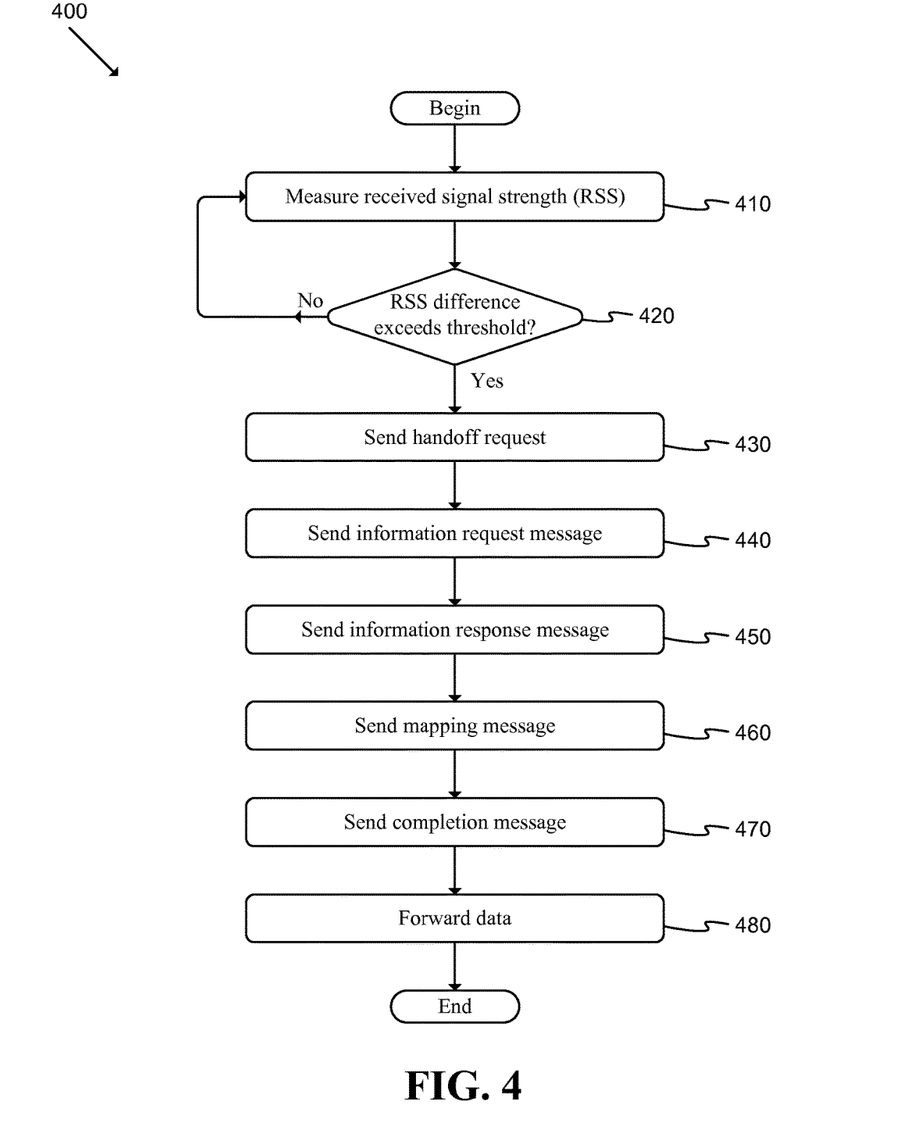
FIG. 4 illustrates a flow chart of a conceptual process used by some embodiments to perform intra-HAP handoff.

FIG. 4 illustrates a flow chart of a conceptual process 400 used by some embodiments to perform intra-HAP handoff. Such a process may begin, for instance, when a GT 110 determines that the RSS of the serving GT beam has fallen below some threshold (e.g., a signal strength threshold, signal to noise ratio threshold, etc.). The process may be performed by the HAP 210 of some embodiments.

As shown, the process may measure (at 410) received signal strength (RSS) of signals received from the neighboring GT beams. The RSS metric may be received signal power, received signal to interference plus noise ratio (SINR), packet error rate, and/or other appropriate metrics.

Next, the GT radio sub-system may compare the RSS of neighboring GT beams, and determine (at 420) whether the measured RSS of a neighboring GT beam exceeds the RSS of the serving GT beam by a specified threshold. If the process determines (at 420) that the difference in RSS does not exceed the threshold, the process may continue to periodically measure (at 410) received RSS.

Alternatively to using measured RSS, in some embodiments, the HAP may periodically send updates including position and orientation of the HAP to all available GTs and GWs. The GTs may use the position and orientation information to determine when handoff from the serving GT beam needs to be initiated and which is the best candidate handoff GT beam.

If the process determines (at 420) that the difference in RSS does exceed the threshold, the neighboring beam associated with the RSS difference that exceeds the threshold may be designated as the candidate handoff GT beam and the process may send (at 430) a handoff request message to the candidate handoff GT beam radio unit. The handoff request message may indicate the serving GT beam, the candidate handoff GT beam as well as other system parameters.

Upon receipt of the handoff request message, the candidate handoff GT beam radio unit may send (at 440) an information request message to the serving GT radio unit requesting information regarding the parameters of the GT (e.g., encryption key, GT IP address, etc.). Next, the current serving GT beam radio unit may send (at 450) an information response message to the candidate handoff GT beam radio unit. The information response message may include GT session related information (e.g., encryption key, GT IP address, etc.).

In order to avoid disruption of data service to the GT, the IP address assigned to the GT must remain the same before and after the handoff process. Prior to handoff, all GT destined IP packets from the Internet are sent to the HAP serving GT radio unit. Before completion of the handoff process, the IP routing tables within the HAP communication payload 215 must be updated by mapping the GT IP address to the MAC address of the candidate handoff GT beam radio unit in order to ensure that packets received from the Internet are routed to the new serving GT radio unit.

Next, the candidate handoff GT beam radio unit may send (at 460) an address mapping message informing all radio units and the router 700 to update their routing tables by mapping the GT IP address to the MAC address of the candidate handoff beam radio unit. After receipt of the address mapping message, the router 700 may send all GT destined IP packets to the candidate handoff GT beam radio unit. As an example of an address mapping message, in Ethernet based local area networks (LANs), address mapping between an IP address and Ethernet MAC address may be done using an address resolution protocol (ARP).

The candidate handoff GT beam radio unit may then send (at 470) a completion message to the serving GT beam radio unit and the GT, thus becoming the new serving GT beam radio unit. Next, the previous serving GT radio unit may send any residual IP data to the new serving GT beam radio unit and then end.

After completing a handoff, the process begin again and start measuring (at 410) RSS.

The handoff processes described above and below may apply to both GTs and GWs. For the sake brevity, the term GT is used in the discussion, but such processes may also apply to intra-HAP beam handoff for GW links as well.

Figure 5:
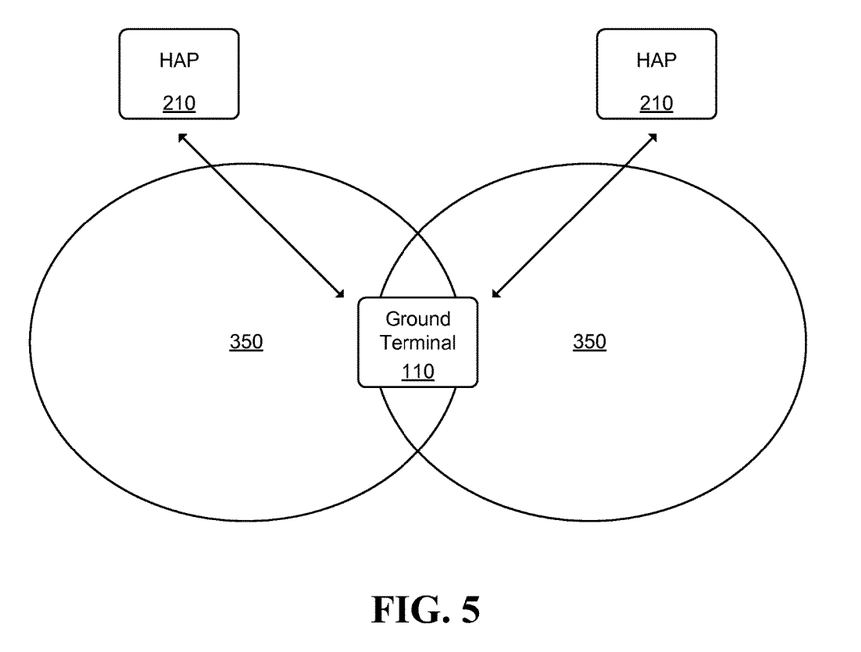
FIG. 5 illustrates an example inter-HAP handoff scenario.

FIG. 5 illustrates an example inter-HAP handoff scenario. In the case of non-geostationary satellite orbit (NGSO) satellites or HAPs such as balloons which travel along orbits around earth, each low earth orbit (LEO) satellite or balloon will move and the beams formed by the LEO satellite or the HAP balloon will move on the ground. Therefore, a LEO satellite or HAP balloon that is currently providing coverage to a GT will eventually move and no longer cover the GT. In the example of FIG. 5, two HAPs 210, each form a beam 350. The GT 110 is at the boundary of coverage between the beams 350 of the two HAPs 210.

The HAPs 210 are moving to the left in this example. Therefore, the beam 350 associated with the HAP 210 on the left will not cover the area associated with the GT 110 as the HAP 210 continues to move to the left. Likewise, the beam 350 associated with the HAP 210 on the right will cover the area associated with the GT 110 as the HAP 210 moves from right to left. In this example, the HAP 210 on the left may be the "serving HAP" that is currently communication with the GT 110. Any other HAPs 210 which are able to be detected by the GT 110, or "neighboring HAPs" may be evaluated (e.g., periodically, continuously, based on some criteria, etc.) to determine whether an RSS measurement associated with a reference signal provided by the neighboring HAPs is stronger than the RSS of a reference signal provided by the serving HAP. When the RSS of a neighboring HAP exceeds the RSS of the serving HAP by a specified threshold, a handoff may be initiated.

The GT 110 may designate the HAP 210 which provides the best signal quality for the GT from among all neighboring HAPs as the "candidate HAP". Alternatively, the GT may receive the location of all neighboring HAPs from a network, and based on the positions of the HAPs, determine the candidate handoff HAP. Each HAP may determine its position using the sensor sub-system 600 and send the position to the rest of the network using the GWs and GTs in its coverage area.

In the case of inter-HAP handoff, the GT may be assigned an IP address by CNE. This address may stay the same for the duration of a session. The GT may advertise the IP address to its upper layers which will in turn use the IP address in any generated IP packets.

When a GT is initially powered on, its radio unit may search for signals from beams of HAPs in the network, and choose the HAP from which it receives the strongest signal to designate as the serving HAP. Next, the GT may initiate a session with the serving HAP by sending out a registration request message to the communication payload associated with the serving HAP. The communication payload radio sub-system may authenticate the GT and send a message to the CNE requesting an IP address for the GT. The CNE may assign an IP address for the GT and send the IP address to the HAP. The HAP communications payload may in turn send a registration response message to GT which may include the assigned IP address for the GT. The GT may then set up an IP tunnel with the CNE using the IP address assigned by the CNE. At some point, the serving HAP may move outside the coverage area of the GT and another HAP, or "candidate HAP", may come into the coverage area of the GT.

Figure 6:
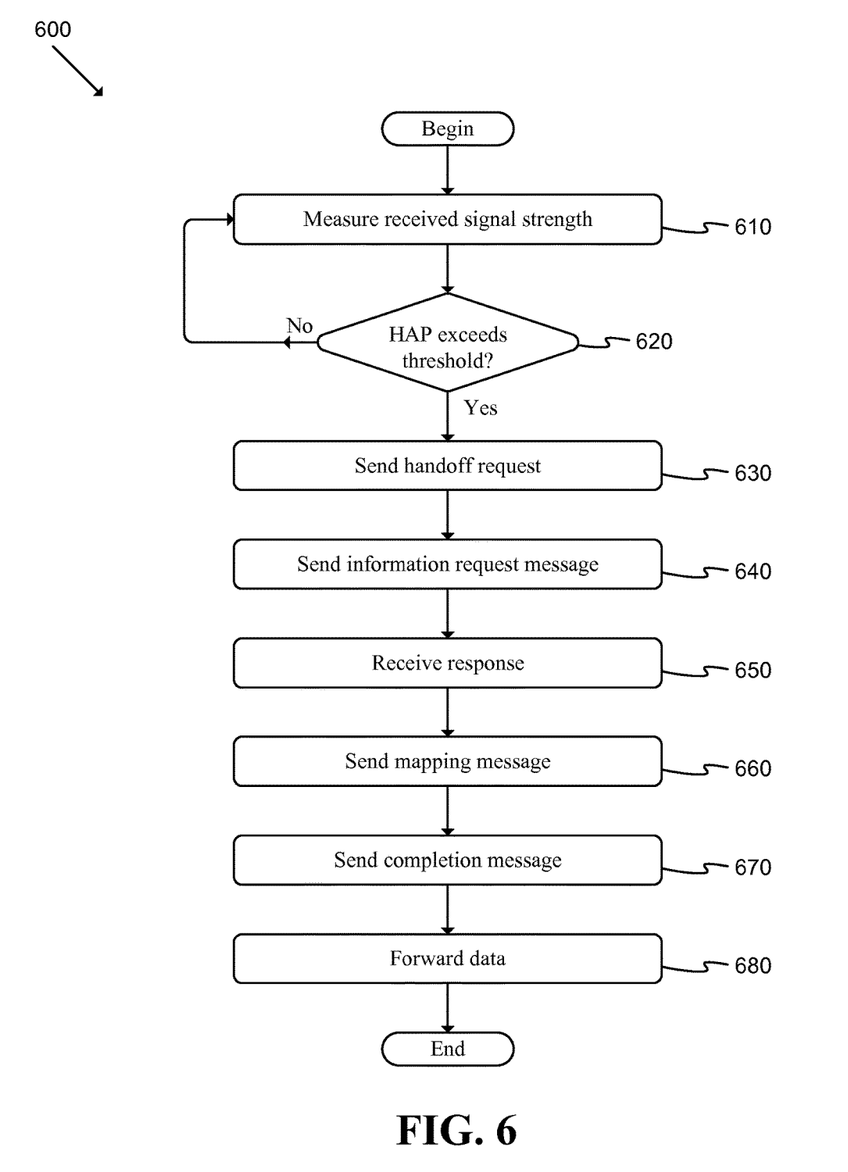
FIG. 6 illustrates a flow chart of a conceptual process used by some embodiments to perform inter-HAP handoff.

FIG. 6 illustrates a flow chart of a conceptual process 600 used by some embodiments to perform inter-HAP handoff. Such a process may begin, for instance, when a GT 110 determines that a reference signal associated with a serving HAP has fallen below some threshold (e.g., a signal strength threshold, signal to noise ratio threshold, etc.). The process may be performed by the GT 110 of some embodiments.

As shown, the GT may periodically measure (at 610) RSS for signals received from other beams of the serving HAP as well as neighboring HAPs. Next, the process may determine (at 620) whether the RSS of any neighboring HAP exceeds a specified threshold of the RSS of the serving HAP. If no candidate HAP exceeds the threshold, the process may repeat operations 610-620 until the process determines (at 620) that the HAP exceeds the threshold.

If the process determines (at 620) that the RSS of a candidate HAP exceeds the threshold, the process may send (at 630) a handoff request to the candidate HAP radio sub-system. In this message, the GT may indicate its IP address and other credentials related to its CNE IP tunnel.

The candidate HAP radio unit may authenticate the GT based on the information in the handoff request message and send (at 640) an information request message to the serving HAP for information regarding GT session parameters. Next, the serving HAP may send an information response message that is received (at 650) by the candidate HAP with information on GT session parameters.

The candidate HAP may then send (at 660) an IP address mapping message to the CNE and to the serving HAP to change their routing tables to route packets destined for the GT to the candidate HAP. Next, the candidate HAP may send (at 670) a handoff completion message to the serving HAP and the GT, after which the candidate HAP may become the new serving HAP. The previous serving HAP may then forward (at 680) all outstanding packets for the GT to the new serving HAP, and the CNE may begin sending packets to the new serving HAP for the GT.

In some cases the serving and candidate HAPs are at different azimuthal angles from the GT and available GTs may use narrow beams for communications. In some embodiments, each GT 110 may have multiple antennas which are directional and each able to point in a different direction (e.g., toward different HAPs). If it is desired to maintain uninterrupted communications at all times to a GT during handoff, then the GT antenna must have at least two beams pointed toward two different directions, one beam toward a serving HAP and the other toward a candidate HAP. The two GT beams are often created using two antennas with mechanical beam steering capability for each antenna. One antenna may be communicating with the serving HAP (such as a LEO satellite or a balloon) and a second antenna may be searching for a HAP whose signal is within a threshold of that of the serving HAP to which the GT or GW should handoff.

During handoff from one HAP to another, first the GT antenna that is pointing a beam toward the candidate HAP may establish a link to the corresponding HAP, and the GT antenna that is pointing a beam toward the serving HAP may break the link with the serving HAP and start searching for candidate HAPs. The drawback of a GT with multiple antenna systems is the size and cost of the GT. In order to reduce the GT cost, one could use only one antenna on the GT and use the knowledge of the real time positions of HAPs, or "ephemerons" of the HAP constellation, to determine the candidate HAP. However, a GT with only one antenna would need to break communications with the serving HAP and mechanically and/or electronically move its antenna toward the candidate HAP which would result in a short interruption to the communication link to the GT. During the time the communications between a GT and HAP are interrupted, different HAP network sub-systems may store outstanding data packets for the GT until the connection to the new serving HAP is established and the packets are able to be forwarded to the GT. Therefore, there will not be any loss of data between the GT and the network, but rather a small delay due to the handoff with a single antenna GT.

As mentioned above, in a two antenna GT design, one antenna is communicating with the serving HAP and the second antenna is searching for a candidate HAP. The gain of the antenna that is searching for the candidate HAP can be much lower than the gain of the antenna that is communicating with the serving HAP. The searching antenna need only have enough gain to be able to detect the reference signal from the neighboring HAPs and estimate the RSS from the signals. Therefore, at least one of the GT antennas can be considerably smaller than the communications antenna. The reduced size of the searching antenna may reduce the cost and the size of the GT.

When a decision is made to handoff from the serving HAP to a chosen candidate HAP, the GT may use the searching antenna to establish a communications link with the candidate HAP. The gain of the searching antenna may be chosen to be large enough that the searching antenna is able to be used to communicate with the candidate HAP but at a lower data rate than the communications antenna. Once the GT establishes a link with the candidate HAP using the searching antenna, the handoff may be completed using the link to the new HAP and the communications antenna may disconnect from the previous serving HAP and move its beam toward the candidate HAP which will be the new serving HAP. Once the communications antenna is pointing toward the new serving HAP, then the communications antenna may be used by the GT to establish a link to the new serving HAP. At this time, the searching antenna will become free to search the neighboring HAPs for a new candidate HAP.

During the time the searching antenna is used to communicate as described above, the peak data rate to the GT will be lower than nominal for a short time until the communication antenna is pointed toward the candidate HAP to take over the communications link from the searching antenna. Although the peak data rate to the GT is smaller than nominal during handoff, the throughput to the GT may still be adequate as more time will be allocated to the GT in handoff to transmit/receive its data. Since more time is given to GTs in handoff and the GTs in handoff take more time to send/receive their data, there will be a small reduction to the overall capacity of the HAP. In other words, the tradeoff for a smaller and less expensive GT antenna system is a slightly lower capacity.

Figure 7:
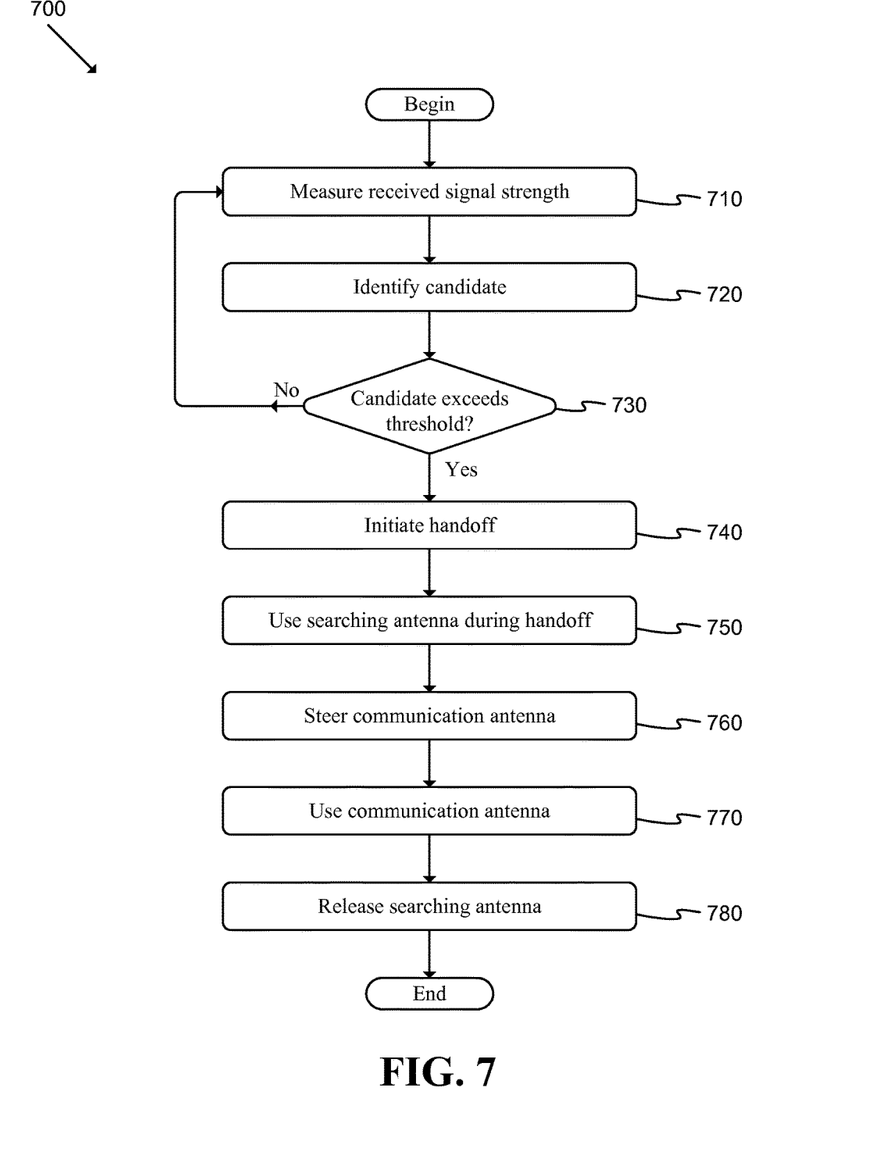
FIG. 7 illustrates a flow chart of a conceptual process used by some embodiments to control search and communications antennas of a GT during inter-HAP handoff.

FIG. 7 illustrates a flow chart of a conceptual process 700 used by some embodiments to control search and communications antennas of a GT during inter-HAP handoff. As shown, the GT may use the searching antenna to measure (at 710) the RSS of the signals received from neighboring HAPs. Next, the GT radio sub-system may identify (at 720) the candidate HAP by choosing the Neighboring HAP with the best signal quality. The GT radio sub-system may compare (at 730) the candidate HAP RSS against a threshold and if the RSS exceeds the threshold, the process may initiate (at 740) the handoff call flow to move the communications link to the candidate HAP.

Once the handoff call flow is complete, the GT searching antenna may be used (at 750) to establish the communications link to the new serving HAP. Next, the GT communications antenna may be steered (at 760) to point toward the new serving HAP. The GT radio unit may then use (at 770) the communications antenna for the link to the new serving HAP and the GT searching antenna may be released (at 680) to start searching the neighboring HAPs for a new candidate HAP.

HAPs may use solar energy for maneuvering as well as communications. HAPs store energy during daylight in batteries and use the energy at night. Therefore, it is highly desirable to minimize the HAP communications payload power consumption in order to minimize the requirement on the amount of solar panels and batteries needed on the HAP. HAPs such as balloons travel over orbits around the earth. As these earth orbiting HAPs travel they may spend considerable amount of time over areas with little data traffic such as deserts with very low population density or oceans. One approach to minimizing the power consumption of these HAPs is to adjust the power consumption of the communications payload to the data traffic requirement for the coverage area the HAP is travelling over. Note that the data traffic requirement may also be a function of time of day. During certain times, such as between mid-night and early morning, the data traffic requirement will be much less than busy times such as evenings or during working hours.

Some embodiments reduce power during low data traffic areas/times via a sleep mode of the radio unit of the communications payload so that the radio is capable of going into sleep mode when there is no data traffic for a specified duration. During sleep mode, an internal clock may be running in the radio unit which will intermittently wake up the radio unit to monitor available GTs to determine if there is data traffic to be carried. In some embodiments, the HAP radio sub-systems may introduce an off-on duty cycle where during the on period the radio unit is active and transmitting/receiving data, and during the off period the radio unit is in sleep mode saving power.

In some embodiments, a MAC scheme allows the radio unit to go to sleep and intermittently wake up to monitor the medium to determine if a GT or a HAP has data to transmit. The MAC divides the time into time frames consisting of time slots. Each frame is comprised of multiple time slots. The frames from HAP to GTs are referred to as downlink frames, and frames where GTs transmit data to the HAP are referred to as uplink frames. In time division duplex (TDD) systems, time is divided between downlink and uplink frames and the downlink and uplink frames share the time where one or more downlink frames are followed by one or more uplink frames. In frequency division duplex (FDD) systems, the downlink and uplink frames are concurrently transmitted on different frequencies.

First, consider the structure of downlink frames from HAP to GTs. Each time slot may carry data for one GT or for multiple GTs. The first time slot in a frame would be used to inform the GTs whether there is data traffic in the remaining slots in the frame and to which GT the data traffic in each time slot of the frame is destined. The first time slot in a frame may be referred to as the scheduling time slot which may carry the MAC ID of the GTs that will receive data during the frame as well as the slot number in which each GT's data will be carried. All GTs and the HAP communications payload radio units may be synchronized so that all GT radio units may wake up at the frame boundary and all GTs may decode the scheduling time slot and determine if they will receive data in one of the time slots of the frame and should wake during the corresponding time slot of the frame to decode the data destined to them. Therefore, during each frame each GT will only need to decode the scheduling time slot and any slots which carry data for the GT.

The uplink frame from GTs to HAP may also be divided into multiple time slots. Some of the time slots may be assigned to be random access channels (RACH). The RACH channel is used by GTs to transmit their bandwidth reservation requests as well as other signaling messages. GTs access the RACH in an unscheduled manner. The remaining time slots of each uplink frame are assigned to different GTs for scheduled transmission. The scheduling time slot in the downlink frame also allocates time slots on the uplink frame where the GTs may transmit their data to the HAP. Therefore, the HAP radio unit may choose to only assign a sub-set of the downlink slots in each frame for sending data to the GTs, and also may choose to assign a sub-set of the time slots on the uplink frame for data transmission by GTs.

Then, the HAP radio unit may assign a number of the downlink and uplink time slots in the corresponding frames needed to send the downlink and uplink data traffic in a given area or time of day. Next, during the time slots that are not assigned for downlink and uplink data transmission, the GT and HAP radio units may go to sleep, thereby saving power. For instance, if during certain times or areas the data traffic is half of the peak data traffic, then the HAP scheduler may assign only half the time slots in each frame, say the first half of the frame, for data transmissions and during the second half of the time slots the HAP and GT Radio Units could go to sleep. In other words, the HAP scheduler may implement "on-off" duty cycles closely matching the offered data traffic where during the on period time slots of the frame are used for data transmission and during the off period the time slots are idle and the radio units are in sleep.

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

One of ordinary skill in the art will recognize that processes 400 and 600-800 are conceptual in nature and may be performed in various different ways without departing from the spirit of the disclosure. For instance, different embodiments may include various different operations, may omit various operations, and/or perform operations in a different order. As another example, each process may be divided into a set of sub-processes or included within a macro-process. The processes may be performed iteratively, based on some criteria, and/or based on other relevant factors.

In some embodiments messages may be sent and/or received out of order from that shown or discussed, including substantially concurrently, using more or fewer messages than indicated, or in reverse order, depending on the functionality involved, as would be understood by those skilled in the art. Furthermore, although several processes have been described using RSS measurements that exceed a threshold of a serving RSS, one of ordinary skill in the art would recognize that RSS measurements within a threshold of a serving RSS may also be used to trigger various operations.

Many of the processes and modules described above may be implemented as software processes that are specified as one or more sets of instructions recorded on a non-transitory storage medium. When these instructions are executed by one or more computational element(s) (e.g., microprocessors, microcontrollers, digital signal processors (DSPs), application-specific integrated circuits (ASICs), field programmable gate arrays (FPGAs), etc.) the instructions cause the computational element(s) to perform actions specified in the instructions.

In some embodiments, various processes and modules described above may be implemented completely using electronic circuitry that may include various sets of devices or elements (e.g., sensors, logic gates, analog to digital converters, digital to analog converters, comparators, etc.). Such circuitry may be adapted to perform functions and/or features that may be associated with various software elements described throughout.

Figure 8:
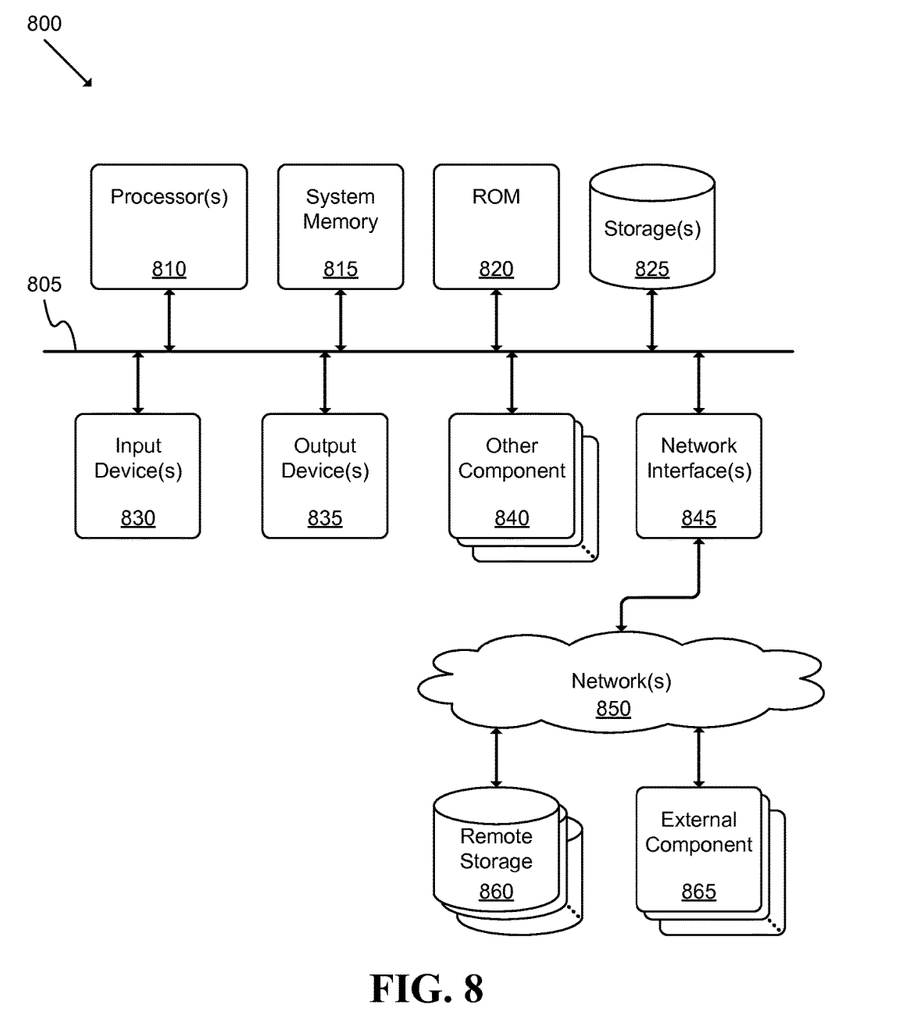
FIG. 8 illustrates a schematic block diagram of a conceptual computer system used to implement some embodiments of the invention.

FIG. 8 illustrates a schematic block diagram of a conceptual computer system 800 used to implement some embodiments. For example, an interactive display, motion sensing/gesturing device or elements, or local and/or remote servers may be implemented using one or more components of a computer system as described in FIG. 8. More specifically, the systems described above in reference to FIGS. 1-3 and 5 may be at least partially implemented using computer system 800. As another example, the processes and protocols described in reference to FIGS. 4, and 6-8 may be at least partially implemented using sets of instructions that are executed using computer system 800.

Computer system 800 may be implemented using various appropriate devices. For instance, the computer system may be implemented using one or more personal computers (PCs), servers, mobile devices (e.g., a smartphone), tablet devices, and/or any other appropriate devices. The various devices may work alone (e.g., the computer system may be implemented as a single PC) or in conjunction (e.g., some components of the computer system may be provided by a mobile device while other components are provided by a tablet device).

As shown, computer system 800 may include at least one communication bus 805, one or more processors 810, a system memory 815, a read-only memory (ROM) 820, permanent storage devices 825, input devices 830, output devices 835, various other components 840 (e.g., a graphics processing unit), and one or more network interfaces 845.

Bus 805 represents all communication pathways among the elements of computer system 800. Such pathways may include wired, wireless, optical, and/or other appropriate communication pathways. For example, input devices 830 and/or output devices 835 may be coupled to the system 800 using a wireless connection protocol or system.

The processor 810 may, in order to execute the processes of some embodiments, retrieve instructions to execute and/or data to process from components such as system memory 815, ROM 820, and permanent storage device 825. Such instructions and data may be passed over bus 805.

System memory 815 may be a volatile read-and-write memory, such as a random access memory (RAM). The system memory may store some of the instructions and data that the processor uses at runtime. The sets of instructions and/or data used to implement some embodiments may be stored in the system memory 815, the permanent storage device 825, and/or the read-only memory 820. ROM 820 may store static data and instructions that may be used by processor 810 and/or other elements of the computer system.

Permanent storage device 825 may be a read-and-write memory device. The permanent storage device may be a non-volatile memory unit that stores instructions and data even when computer system 800 is off or unpowered. Computer system 800 may use a removable storage device and/or a remote storage device as the permanent storage device.

Input devices 830 may enable a user to communicate information to the computer system and/or manipulate various operations of the system. The input devices may include keyboards, cursor control devices, audio input devices and/or video input devices. Output devices 835 may include printers, displays, and/or audio devices. Some or all of the input and/or output devices may be wirelessly or optically connected to the computer system.

Other components 840 may perform various other functions. These functions may include performing specific functions (e.g., graphics processing, sound processing, etc.), providing storage, interfacing with external systems or components, etc.

Finally, as shown in FIG. 8, computer system 800 may be coupled to one or more networks 850 through one or more network interfaces 845. For example, computer system 800 may be coupled to a web server on the Internet such that a web browser executing on computer system 800 may interact with the web server as a user interacts with an interface that operates in the web browser. Computer system 800 may be able to access one or more remote storages 860 and one or more external components 865 through the network interface 845 and network 850. The network interface(s) 845 may include one or more APIs that may allow the computer system 800 to access remote systems and/or storages and also may allow remote systems and/or storages to access computer system 800 (or elements thereof).

As used in this specification and any claims of this application, the terms "computer", "server", "processor", and "memory" all refer to electronic devices. These terms exclude people or groups of people. As used in this specification and any claims of this application, the term "non-transitory storage medium" is entirely restricted to tangible, physical objects that store information in a form that is readable by electronic devices. These terms exclude any wireless or other ephemeral signals.

It should be recognized by one of ordinary skill in the art that any or all of the components of computer system 800 may be used in conjunction with some embodiments. Moreover, one of ordinary skill in the art will appreciate that many other system configurations may also be used in conjunction with some embodiments.

In addition, while the examples shown may illustrate many individual modules as separate elements, one of ordinary skill in the art would recognize that these modules may be combined into a single functional block or element. One of ordinary skill in the art would also recognize that a single module may be divided into multiple modules.

The foregoing relates to illustrative details of exemplary embodiments and modifications may be made without departing from the scope of the disclosure. For example, several embodiments were described above by reference to particular features and/or components. However, one of ordinary skill in the art will realize that other embodiments might be implemented with other types of features and components, and that the disclosure is not to be limited by the foregoing illustrative details.

I claim:

1. A communication system comprising:
a core network element that has Internet access, the core network element located on the ground;
at least one gateway (GW) communicatively coupled to the core network element, the at least one GW able to provide broadband connectivity, the at least one GW located on the ground;
a set of high altitude platforms (HAPs) communicatively coupled to the at least one GW, each HAP comprising propulsion elements, a ground terminal (GT) radio sub-system including a GT radio and a GT antenna sub-system, gateway (GW) radio sub-system including a GW radio and a GW antenna sub-system, and a HAP radio sub-system including a HAP radio and a HAP antenna sub-system, wherein at least one HAP is able to communicate with at least one GW via the gateway radio sub-system using radio frequencies, and each HAP is able to communicate with each other HAP via the HAP radio sub-system using radio frequencies; and
a set of ground terminals (GTs), wherein each GT is able to communicate with each HAP via the ground terminal radio sub-system using radio frequencies and each GT is communicatively coupled to at least one HAP from the set of HAPs,
wherein Internet connectivity is provided to each GT in the set of GTs via the core network element, the at least one GW, and at least one HAP from the set of HAPs and wherein each GT from the set of GTs is configured to:
communicate with a HAP from the set of HAPs using a serving GT beam from a plurality of GT beams formed by the HAP,
measure received signal strength (RSS) of signals received from each GT beam in a set of neighboring GT beams from the plurality of GT beams formed by the HAP, and
compare the RSS of signals received from each of the set of neighboring GT beams to measured RSS of the serving GT beam, and designate one neighboring GT beam from the set of neighboring GT beams as a candidate handoff GT beam when the RSS of the one neighboring GT beam is within a threshold of the RSS of the serving GT beam.

2. The communications system of claim 1, wherein:
each GT is further able to send a handoff request message to a radio of the HAP providing the serving GT beam;
the radio of the HAP providing the candidate handoff GT beam is able to send an information request message to a radio of the HAP providing the serving GT beam requesting information for GT IP session parameters and receiving the information in an information response message from the radio providing the serving GT beam;
the radio providing the candidate handoff GT beam is able to send an IP address mapping message to the HAP communications sub-systems to map the GT IP address to the candidate handoff GT Beam medium control access (MAC) address;
the radio providing the candidate handoff GT beam is able to send a handoff completion message to the HAP communications sub-system and the candidate handoff GT beam becomes a new HI-AP serving GT beam; and
the radio providing the serving GT Beam is able to send any outstanding packets for the GT to the radio providing the new HAP serving GT Beam, and to the HAP communication sub-systems sending IP packets to the radio providing the new HAP serving GT Beam.

3. The communication system of claim 1, wherein the set of neighboring GT beams includes at least one GT beam of a second HAP from the set of HAPs,
the system further comprising:
the GT measuring received signal strength (RSS) on signals received from the neighboring GT beams including the at least one GT beam from the second HI-AP;
the GT comparing the RSS of the signals of the at least one GT beam from the second HAP to that of the serving HAP, and designating the second HAP with associated RSS within a threshold of the serving HAP as a candidate HAP.

4. The communication system of claim 3, further comprising:
the GT sending a handoff request message to the serving HAP;

the candidate HAP sending a information request message to the serving HAP requesting information for the GT IP session parameters and receiving the information in an information response message from the serving HAP;

the candidate HAP sending an IP address mapping message to the HAP communications sub-systems to map the GT IP address to the new candidate HAP MAC address;

the candidate HAP sending a handoff completion message to the PIAP communications network sub-systems and becoming the new serving HAP; and the serving HAP sending any outstanding packets for the GT to the new serving HAP, and to the HAP communication network sub-systems sending IP packets to the new serving HAP.

5. The communication system of claim 1, further comprising:

the HAP periodically sending HAP position coordinates and orientation to the GTs; and the GTs using the HAP position coordinates and orientation to determine the candidate handoff GT beam and timing of the handoff.

6. The communications system of claim 5, further comprising:

the GT sending a handoff request message to the radio of the HAP providing the serving GT beam;

the radio of the HAP providing the candidate handoff serving GT Beam sending an information request message to the radio of the HAP providing the serving GT beam requesting information for the GT IP session parameters and receiving the information in an information response message from the radio of the HAP providing the serving GT beam;

the radio of the HAP providing the candidate handoff GT Beam sending an IP address mapping message to the HAP communications sub-systems to map the GT IP address to the MAC address of the radio of the HAP providing the candidate handoff GT beam;

the radio of the HAP providing candidate handoff GT beam sending a handoff completion message to the HAP communications sub-systems and the candidate handoff GT beam becoming the new serving GT beam; and the radio of the HAP providing the serving GT beam sending any outstanding packets for the GT to the radio providing the new serving GT beam, and to the HAP communication sub-systems sending IP packets to the new HAP serving GT beam.

7. The communications system of claim 1, wherein each HAP, each GT, and each GW comprises at least one radio sub-system and each radio sub-system comprises a radio unit that is able to enter sleep mode to save power when a specified criteria for data traffic passing through the radio sub-system is met.

8. The communications system of claim 1, wherein each HAP, each GT, and each GW comprises at least one communications sub-systems and each communications sub-system is able to save power by entering sleep mode when a specified criteria for data traffic passing through the communications sub-system is met.

9. The communications system of claim 1, wherein:

a radio unit associated with each HAP is directed to enter sleep mode when no data traffic is passing through the radio unit; and a communications sub-system associated with each HAP is directed to enter sleep mode when no data traffic is passing through the communications sub-system.

10. An automated method for performing intra-high altitude platform (HAP) handoff the method comprising:

measuring received signal strength (RSS) a plurality of ground terminal (GT) beams of a set of neighboring GT beams using a radio subsystem of a GT from a plurality of GTs, each of the plurality of GT beams in the set of neighboring GT beams being formed by a HAP, the HAP including propulsion elements, a ground terminal (GT) radio sub-system including a GT radio and a GT antenna sub-system, gateway (GW) radio sub-system including a GW radio and a GW antenna sub-system, and a HAP radio sub-system including a HAP radio and a HAP antenna sub-system;

comparing the RSS of each of the plurality of GT beams of the set of neighboring GT beams to a measured RSS of a serving GT beam formed by the HAP using the radio subsystem of the GT;

sending a handoff request message from the GT to a radio in the HAP forming a candidate neighboring GT beam using the GT radio subsystem of the GT when the RSS of the candidate neighboring GT beam exceeds the RSS of the serving GT beam from the HAP, wherein Internet connectivity is provided to each GT in the set of neighboring GTs via a core network element, at least one gateway, and at least one HAP.

11. The automated method of claim 10 further comprising:

sending an information request message from a radio in the HAP forming the candidate neighboring GT beam to a radio in the HAP forming the serving GT beam; and receiving an information response message from the radio in the HAP forming the serving GT beam in the radio of the HAP forming candidate neighboring GT beam.

12. The automated method of claim 11 further comprising:

sending a mapping message from the radio in the HAP forming the candidate neighboring GT beam to all of radios in a network;

sending a completion message from the radio in the HI-AP forming the candidate neighboring GT beam to the radio in the HAP forming serving GT beam; and forwarding received data to the radio forming the candidate neighboring GT beam from the radio forming the serving GT beam.

13. The automated method of claim 11, wherein the information response message comprises an encryption key and a GT IP address and the mapping message comprises medium access control (MAC) address of the radio in the HAP forming unit the candidate neighboring GT beam.

14. The automated method of claim 10 further comprising:

directing a radio associated with the HAP to enter sleep mode when no data traffic is passing through the radio performed by the HAP; and directing a communications sub-system in the HAP to enter sleep mode when no data traffic is passing through the communications sub-system performed by the HAP.

15. An automated method for performing inter-high altitude platform (HAP) handoff, within an aerial communication network, the method comprising:

identifying a serving HAP from among a plurality of available HAPs performed by a ground terminal having a search antenna and a communications antenna, wherein each of the plurality of available HAPs comprises a propulsion element and each available HAP is able to be controlled by a pilot, and the serving HAP is able to communicate with at least one other HAP from among the plurality of available HAPs;

communicating with the serving HAP using the communications antenna in the ground terminal;

measuring a received signal strength (RSS) from the serving HAP performed by the ground terminal using the communications antenna;

measuring received signal strength (RSS) from each HAP in a set of candidate HAPs performed by the ground terminal using the search antenna;

determining that a handoff is required from the serving HAP to a new serving HAP selected from a set of candidate HAPs from the plurality of available HAPs based on the measured RSSs of the serving HAP and each of the set of candidate HAPs performed by the ground terminal, communicating with the serving hap using the communications antenna in the ground terminal and with the new serving HAP using the search antenna in the ground terminal during the handoff;

moving a beam of the communications antenna in the ground terminal toward the new serving HAP at handoff completion;

communicating with the new serving HAP using the communications antenna of the ground terminal after handoff completion; and wherein Internet connectivity is provided to at least one ground terminal via a core network element, at least one gateway, and the serving HAP.

16. The automated method of claim 15 further comprising:

sending a handoff request to the new serving HAP from the ground terminal using the search antenna;

sending an information request message to the new serving HAP from the ground terminal using the search antenna; and receiving an information response message from the new serving HAP in the ground terminal using the search antenna.

17. The automated method of claim 15 further comprising:

directing a radio associated with each HAP to enter sleep mode when no data traffic is passing through the radio unit performed by each HAP; and directing a communications sub-system associated with each HAP to enter sleep mode when no data traffic is passing through the communications sub-system performed by each HAP.

18. The automated method of claim 17, wherein the searching antenna is smaller than the communications antenna.

* * * * *